United States Patent
Roach et al.

(10) Patent No.: US 11,975,827 B2
(45) Date of Patent: May 7, 2024

(54) ROTOR LOCK AND ROTOR ALIGNMENT MECHANISMS AND RELATED METHOD

(71) Applicant: GADFIN LTD., Rehovot (IL)

(72) Inventors: Robert Roach, Ramat Hasharon (IL); Eyal Regev, Mazkeret-Batya (IL)

(73) Assignee: GADFIN LTD., Rehovot (IL)

( * ) Notice: Subject to any disclaimer, the term of this patent is extended or adjusted under 35 U.S.C. 154(b) by 0 days.

(21) Appl. No.: 18/034,742

(22) PCT Filed: Nov. 2, 2021

(86) PCT No.: PCT/IL2021/051300
§ 371 (c)(1),
(2) Date: May 1, 2023

(87) PCT Pub. No.: WO2022/097137
PCT Pub. Date: May 12, 2022

(65) Prior Publication Data
US 2023/0406490 A1  Dec. 21, 2023

(30) Foreign Application Priority Data
Nov. 5, 2020 (IL) .......................... 278515

(51) Int. Cl.
*B64C 27/30* (2006.01)
(52) U.S. Cl.
CPC .................. *B64C 27/30* (2013.01)

(58) Field of Classification Search
CPC .................................................. B64C 27/322
See application file for complete search history.

(56) References Cited

U.S. PATENT DOCUMENTS

| 9,783,288 B1* | 10/2017 | Moore ................. B64C 27/322 |
| 2017/0225779 A1 | 8/2017 | Gamble |
| 2020/0108918 A1 | 4/2020 | Douglas et al. |

FOREIGN PATENT DOCUMENTS

WO  2018106382 A1  6/2018

OTHER PUBLICATIONS

International Search Report for PCT/IL2021/051300; dated Feb. 8, 2022 (5 pages).
Written Opinion of the International Searching Authority for PCT/IL2021/051300; dated Feb. 8, 2022 (6 pages).

* cited by examiner

*Primary Examiner* — Brian O Peters
(74) *Attorney, Agent, or Firm* — Roach Brown McCarthy & Gruber, P.C.; Kevin D. McCarthy (57) ABSTRACT

A rotor lock mechanism is disclosed. The mechanism includes a pair of arms at a chosen offset angle # with respect to a long axis of a pair of rotor blades; an arm engagement device configured to restrain rotary motion of the arms; and a rotor drive shaft to which the pair of arms and the pair of rotor blades are attached. A method of use is also disclosed.

8 Claims, 7 Drawing Sheets

ROTOR LOCK AND ROTOR ALIGNMENT MECHANISMS AND RELATED METHOD

DETAILS OF RELATED APPLICATIONS

This PCT application claims priority from Israeli application 278515 filed on Nov. 5, 2020 according to 35 U.S.C. § 119 (a) and having the same title and Applicant as the present application; which is fully incorporated herein by reference.

FIELD OF THE INVENTION

The invention is in the field of drag reduction in the context of aircraft.

BACKGROUND OF THE INVENTION

In aeronautic design the balance between drag and lift is an important consideration. Fixed-wing aircraft control lift and drag by changing the tilt angle of their wings using ailerons on the tail-edge of their wings. Changing the shape of the airfoil facilitates lift-off, cruising and landing according to the needs of the pilot.

Helicopters, on the other hand, use their main rotors for lift and a tail rotor to control the direction of flight. The main rotors can be tilted to move the helicopter forwards or backwards. This enables helicopters to fly without wings.

Hybrid aircraft that utilize both 'fixed-wing' as well as helicopter-style rotors are becoming more popular. These hybrid aircraft use the vertical lift capability of rotors as well as the low-drag cruising of fixed-wing aircraft. Drones incorporating both vertical lift rotors and fixed-wing flight apparatus have been designed. These hybrid aircraft often use multiple rotors organized in pairs. Each pair of rotors typically includes a clockwise rotor (CWR) and a counter-clockwise rotor (CCWR).

SUMMARY OF THE INVENTION

A broad aspect of the invention relates reducing drag from rotors when they are not in use.

One aspect of some embodiments of the invention relates to stopping each rotor of a hybrid aircraft at a desired angle with respect to travel direction when not in use. In some embodiments the desired angle with respect to travel direction is selected to reduce drag. In some embodiments reducing drag contributes to a decrease in rate of energy consumption and/or an increase in range. Alternatively or additionally, in some embodiments the desired angle varies with current flight mode.

Another aspect of some embodiments of the invention relates to a rotor lock mechanism. In some embodiments the mechanism locks inactive rotor blades in a desired angle with respect to travel direction. According to these embodiments the desired angle is chosen such that it represents the lowest average drag for the sum of all anticipated flight scenarios for the aircraft. According to this embodiment of the invention only one desired angle is set. In other exemplary embodiments of the invention, an on-board computer is used to change the desired angle according to flight conditions and a visual marker serves as a reference point.

A further aspect of some embodiments of the invention relates to an alignment mechanism. In some embodiments the alignment mechanism employs a sensor that detects the rotor angle with respect to travel direction using a visual marker.

A further additional aspect of some embodiments of the invention relates to one or more pairs of magnets that lock the rotors in position. According to various exemplary embodiments of the invention the magnets are permanent magnets or electromagnets.

It will be appreciated that the various aspects described above relate to solution of technical problems associated with drag from rotors that are not in use.

Alternatively or additionally, it will be appreciated that the various aspects described above relate to solution of technical problems related to increasing flight range of hybrid aircraft.

In some exemplary embodiments of the invention there is provided a rotor lock mechanism including: (a) a pair of arms at a chosen offset angle θ with respect to a long axis of a pair of rotor blades; (b) an arm engagement device configured to restrain rotary motion of the arms; and (c) a rotor drive shaft to which the pair of arms and the pair of rotor blades are attached. In some embodiments the mechanism includes pivot axles in each of the arms. Alternatively or additionally, in some embodiments the mechanism includes a pair of engagement posts positioned to engage and retain a distal portion of each of the lock arms when they are rotated downwards with respect to the pivot axles. Alternatively or additionally, in some embodiments the mechanism includes a magnet in a distal portion of each of the lock arms; and a corresponding magnet of opposite polarity in a top surface of each of the engagement posts. Alternatively or additionally, in some embodiments the mechanism includes a magnet in a distal portion of each of the lock arms; and a corresponding electromagnet in a top surface of each of the engagement posts. Alternatively or additionally, in some embodiments the mechanism includes a rotating rotor hub marked with one or more markers; and a fixed position sensor configured to provide output signal indicating presence (1) or absence (0) of the marker; and an electronic controller configured to respond to output signal (0) by pulsing a motor powering the rotor hub. Alternatively or additionally, in some embodiments the mechanism includes a collar on the rotor drive shaft which the pair of arms is attached to; and a motor that turns the collar with respect to the rotor drive shaft.

In some exemplary embodiments of the invention there is provided an alignment control mechanism including: a rotating rotor hub marked with one or more markers; a fixed position sensor configured to provide output signal indicating presence (1) or absence (0) of the marker; and an electronic controller configured to respond to output signal (0) by pulsing a motor powering the rotor hub.

In some exemplary embodiments of the invention there is provided a method including: (a) Independently determining a desired stowing angle with respect to travel direction for each rotor in a multi-rotor aircraft; and (b) stopping and locking each rotor at the desired stowing angle.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting. As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

For purposes of this specification and the accompanying claims, the term "distal" is relative to the drive shaft (e.g. 8 in the depicted exemplary embodiment of the FIGS.).

Implementation of a method and/or system and/or mechanism according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Embodiments of the invention relate to rotor lock mechanisms, alignment control mechanisms, and methods. Specifically, some embodiments of the invention can be used to reduce drag from aircraft rotors when the rotors are not in use.

The principles and operation of a mechanism and/or method according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary Rotor Lock Mechanism

FIG. 1, FIG. 2, FIG. 3, FIG. 4, FIG. 5 and FIG. 6 are different views depicting components of a rotor lock mechanism according to various embodiments of the invention.

Figure 2:
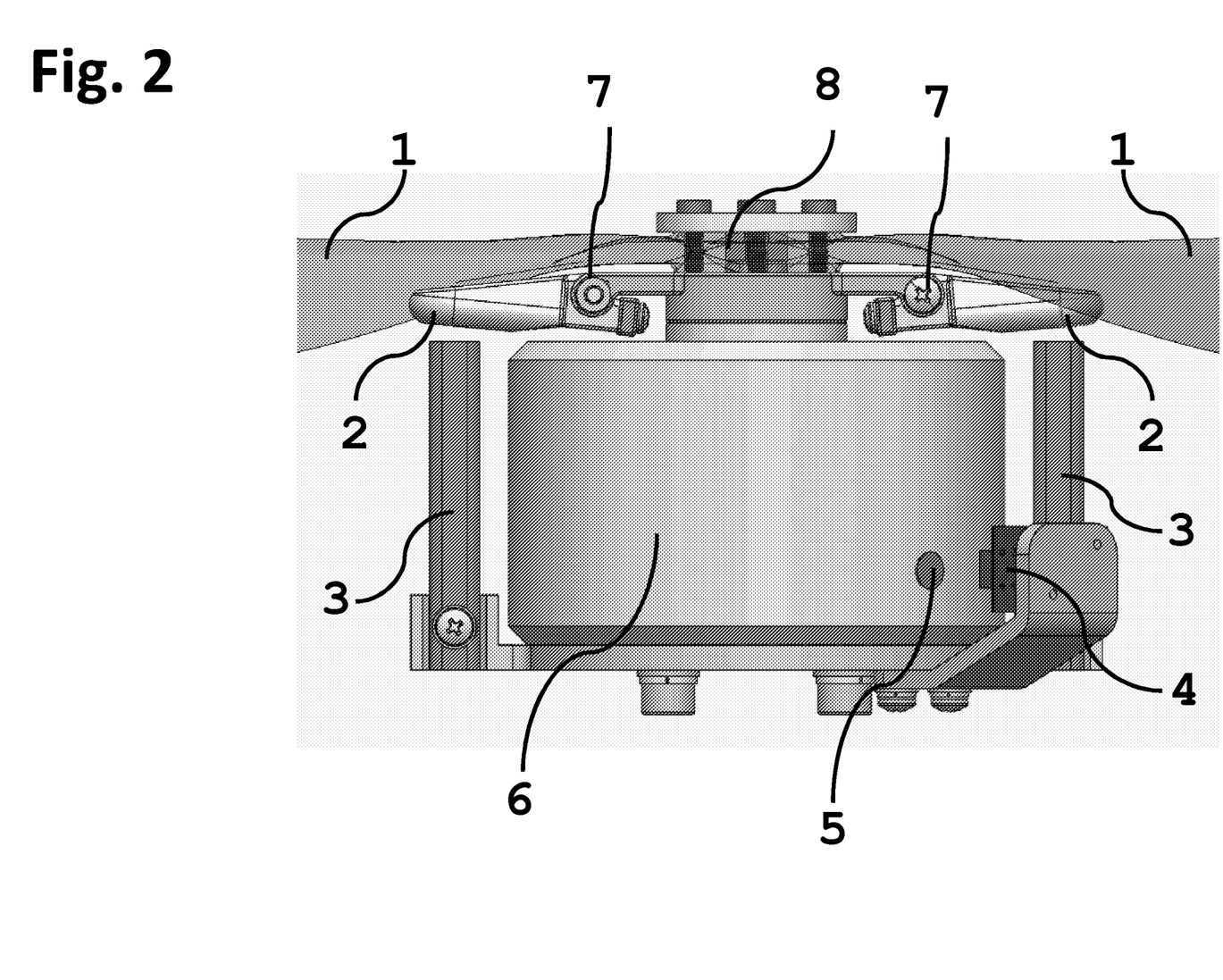
FIG. 2 is a side view of external components of the rotor lock mechanism of FIG. 1 with the lock disengaged.
Figure 3:
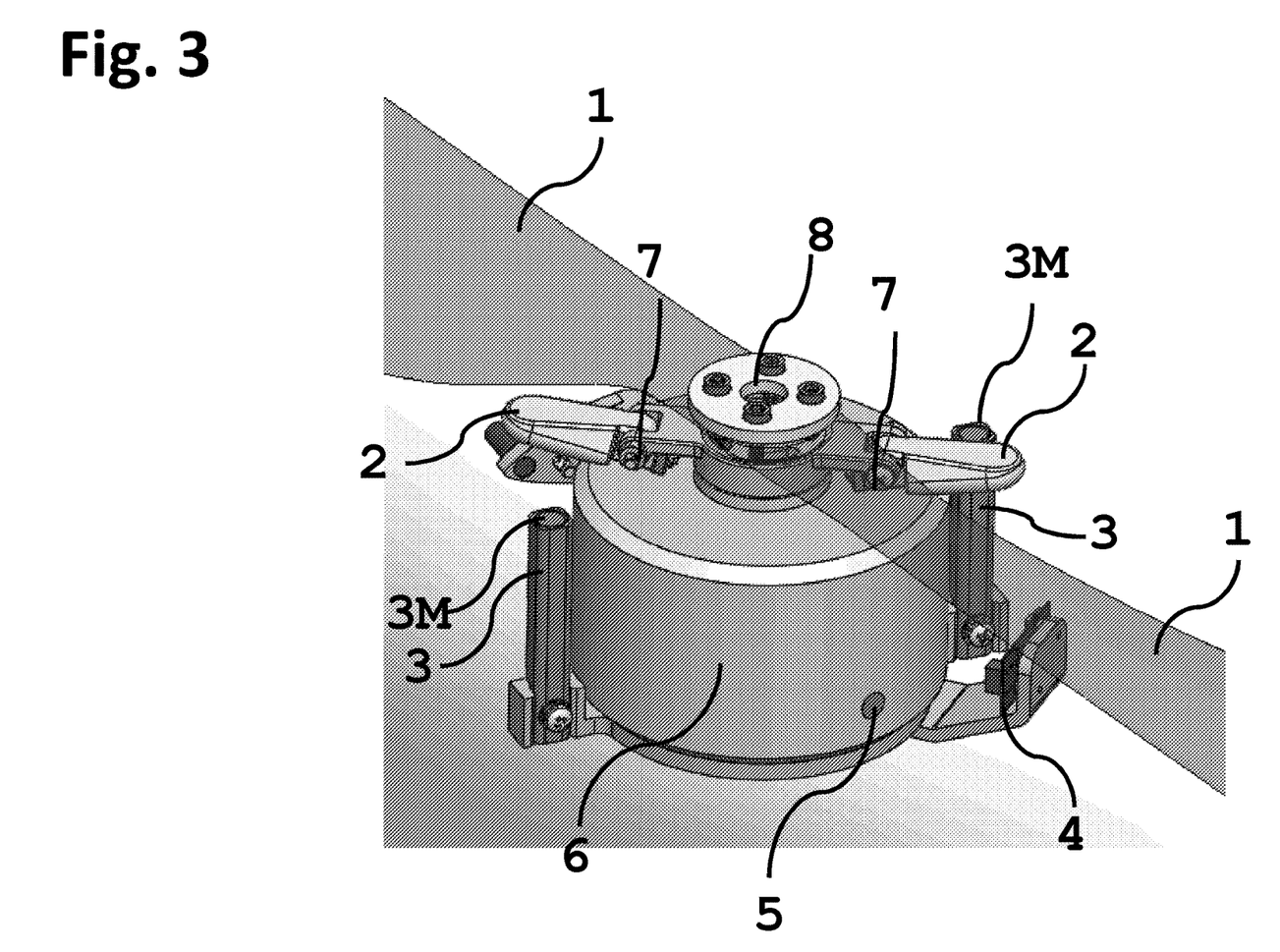
FIG. 3 is a top perspective view of external components of the rotor lock mechanism of FIG. 1 with the lock disengaged.
Figure 4:
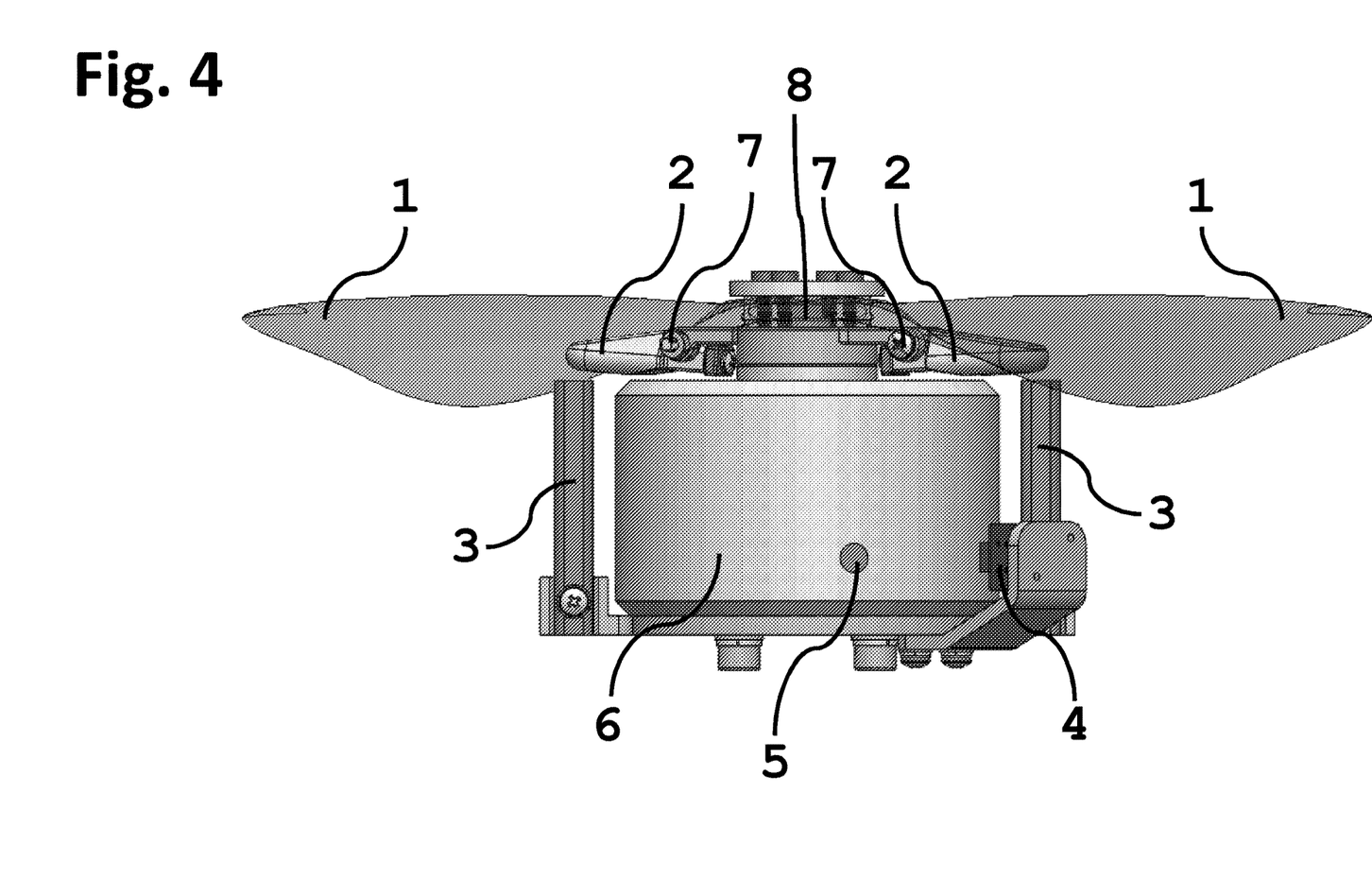
FIG. 4 is a side view of external components of the rotor lock mechanism of FIG. 1 with the lock disengaged.

In FIGS. 2, 3 and 4 the lock mechanism is disengaged.

Figure 5:
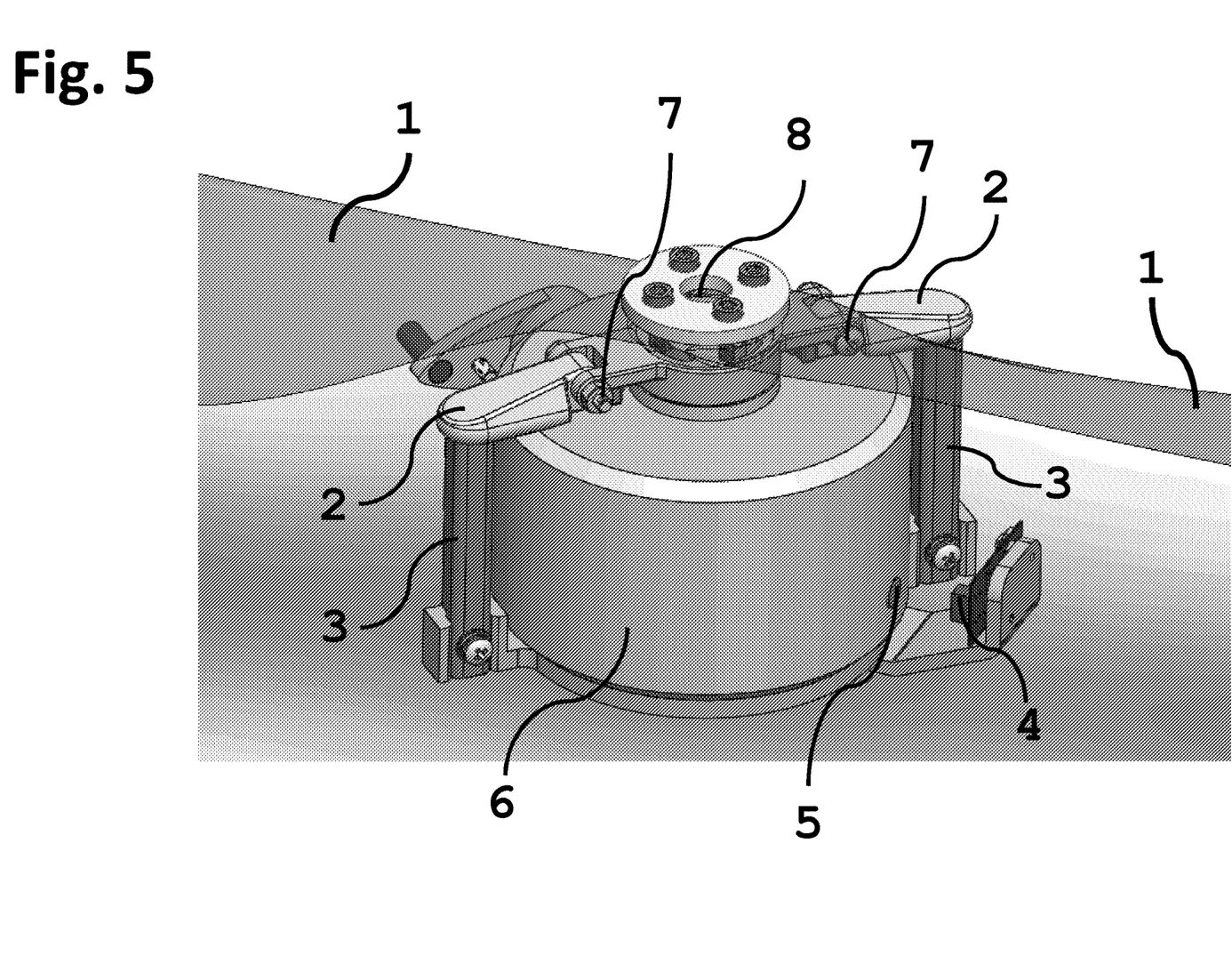
FIG. 5 is a top perspective view of external components of the rotor lock mechanism of FIG. 1 with the lock engaged.
Figure 6:
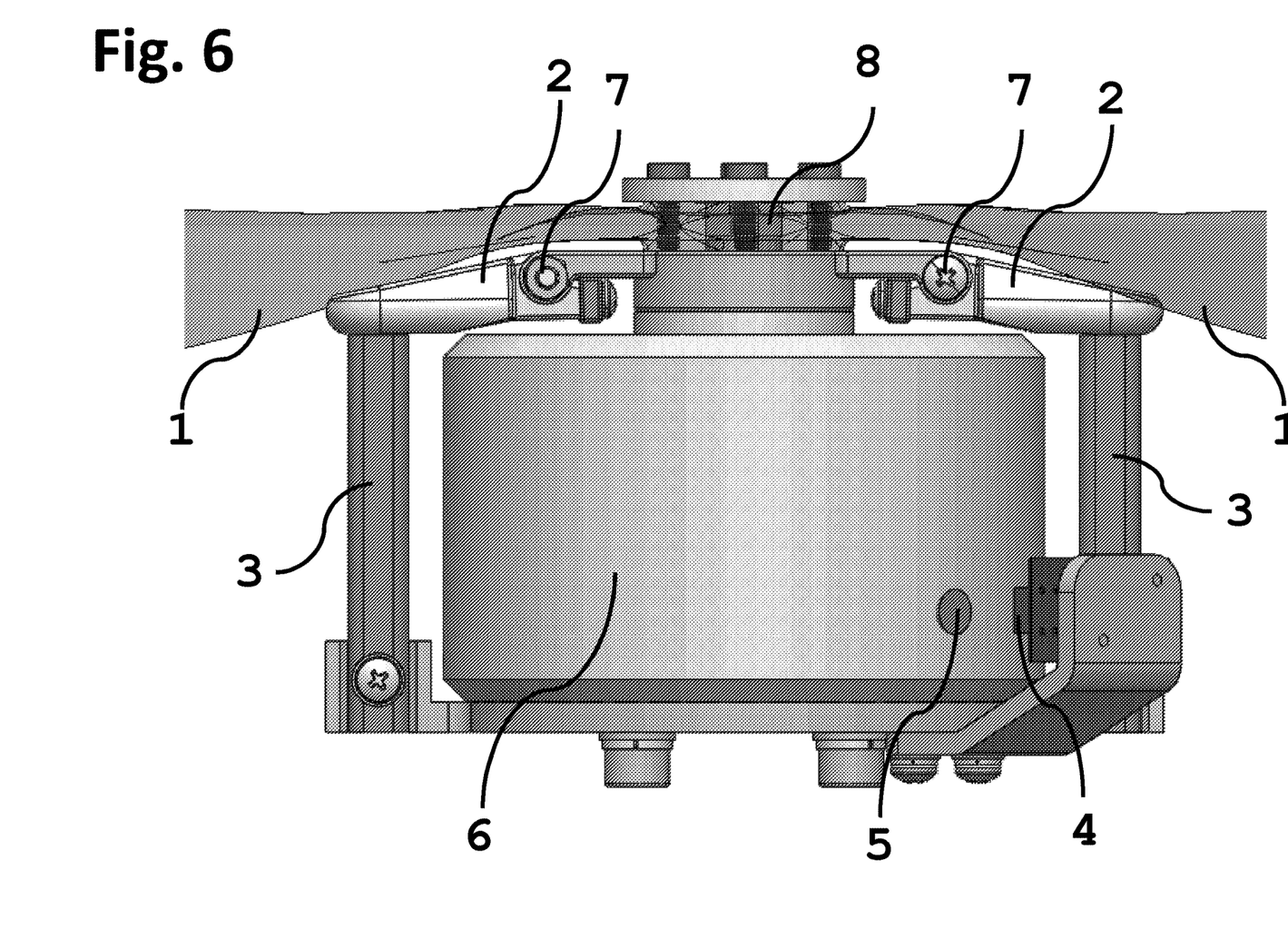
FIG. 6 is a side view of external components of the rotor lock mechanism of FIG. 1 with the lock engaged.
Figure 7:
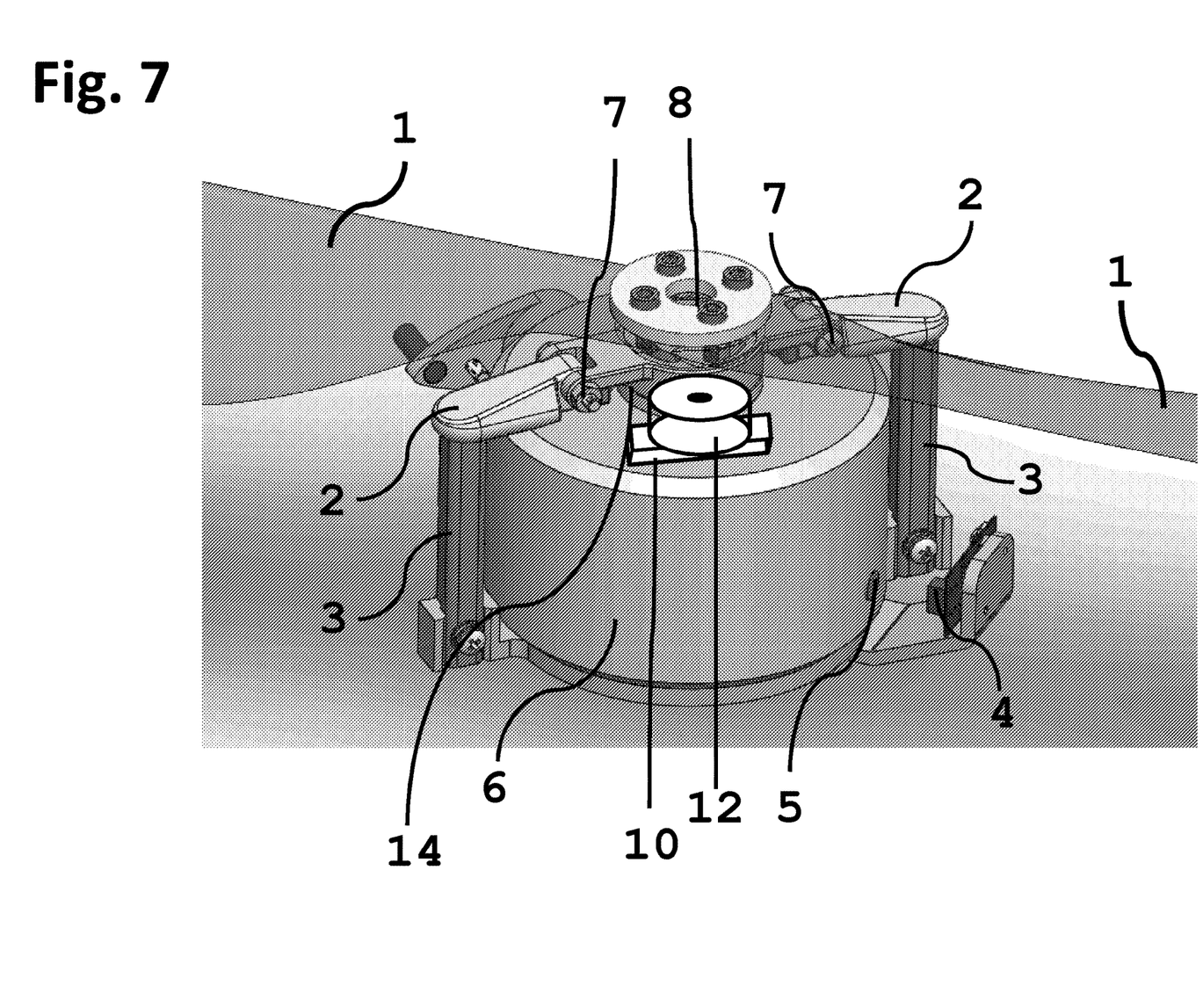
FIG. 7 is a top perspective view as in FIG. 5 with an optional angle adjustment mechanism.

In FIGS. 5, 6 and 7 the lock mechanism is engaged.

Figure 1:
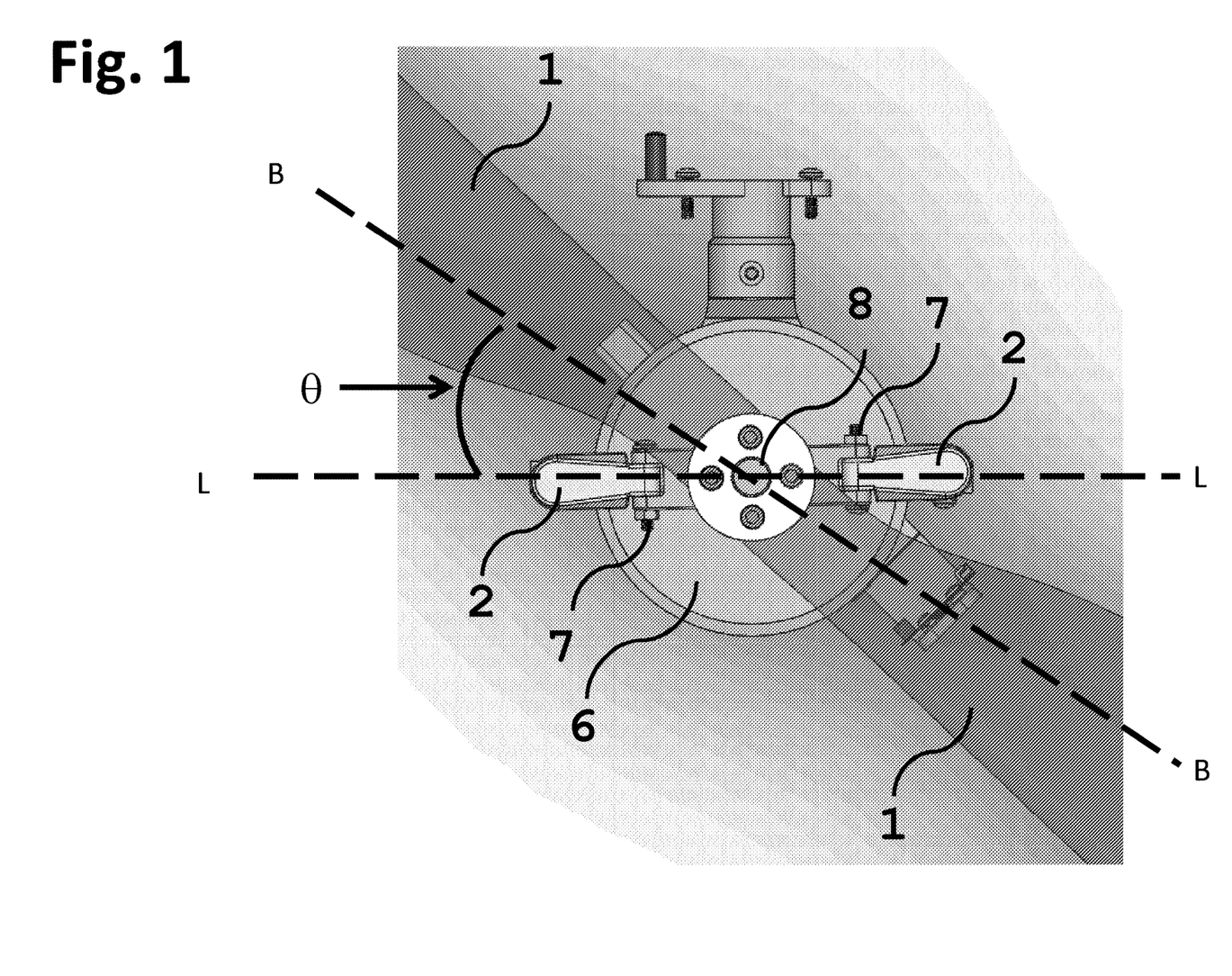
FIG. 1 is a top view of external components of a rotor lock mechanism according to an exemplary embodiment of the invention.

In the depicted embodiment, the rotor lock mechanism includes a pair of arms 2 at a chosen offset angle θ (see FIG. 1) with respect to a long axis (B-B) of a pair of rotor blades 1. In FIG. 1, offset angle θ is depicted relative to line L-L which is coincident with a long axis of arms 2. In many embodiments of the invention, line L-L is also coincident with a direction of travel of the aircraft.

In FIGS. 2, 3, 4, 5, 6 and 7 an arm engagement device 3 (depicted in the figures as a post) configured to restrain rotary motion of arms 2 is visible.

In each of the figures, a rotor drive shaft 8 to which pair of arms 2 and pair of rotor blades 1 is visible.

In some embodiments each arm 2 has a pivot axle 7. In the figures, the pivot axles are depicted as bolts 7 with corresponding nuts. In other exemplary embodiments of the invention, other hardware is substituted for bolts. During flight when rotor drive shaft 8 is turning, arms 2 swing upward about pivot axles 7 due to centrifugal force (FIGS. 2, 3 and 4). When rotor drive shaft 8 slows or stops, arms 2 drop back down (FIGS. 5, 6 and 7).

In the depicted embodiment, the mechanism includes a pair of engagement posts 3 positioned to engage and retain a distal portion of each of lock arms 2 when they are rotated downwards with respect to said pivot axles 7 (FIGS. 5, 6 and 7). When lock arms 2 are rotated upwards with respect to said pivot axles 7, arms 2 easily clear the tops of posts 3 (FIGS. 2, 3 and 4).

In some exemplary embodiments of the invention, each lock arm 2 includes a magnet (not depicted) in a distal portion thereof. According to these embodiments a corresponding magnet (3M in FIG. 3) of opposite polarity is positioned in a top surface of each of engagement posts 3. According to these embodiments, when arms 2 rotate downwards with respect to axles 7, the magnets in 2 engage the magnets in 3 as depicted in FIGS. 5, 6 and 7.

In some exemplary embodiments of the invention, each lock arm 2 includes a magnet (not depicted) in a distal portion thereof. According to these embodiments a corresponding electromagnet 3M (FIG. 3) is positioned in a top surface of each of engagement posts 3. According to these embodiments, when electromagnets in 3 have opposite polarity to magnets in 2, the electromagnets pull lock arms 2 down and engage, locking rotors 1. When electromagnets in 3 have the same polarity as magnets in 2, the electromagnets push lock arms 2 upwards, disengage, and free rotors 1.

Alternatively or additionally, in some embodiments the lock mechanism includes a rotating rotor hub 6 marked with one or more markers 5 and a fixed position sensor 4 configured to provide output signal indicating presence (1) or absence (0) of said marker. According to these embodiments, an electronic controller (not depicted) is configured to respond to output signal (0) by pulsing a motor powering rotor hub 6 (and rotors 1). A pulse activates drive shaft 8 briefly and causes angular displacement of arms 2 and rotors 3. Typically, 4 or 5 pulses is sufficient to bring arms 2 into alignment with posts 3 so the clock mechanism can engage and lock rotors 1. In some embodiments the electronic controller function is provided by the flight computer of the aircraft. In some embodiments the flight computer of the aircraft has software installed for this purpose.

FIG. 7 is a top perspective view as in FIG. 5 with an optional angle adjustment mechanism added. The optional angle adjustment mechanism includes a collar 14 on rotor drive shaft 8 which the pair of arms 2 is attached to and a motor 10 that turns collar 14 with respect to rotor drive shaft 8. Operation of the angle adjustment mechanism adjusts angle θ.

According to various exemplary embodiments of the invention motor 10 employs an intervening gear that engages arcuate teeth on collar 14, or a belt drive mechanism or a friction wheel 12 as depicted.

Exemplary Alignment Control Mechanism

Referring again to FIG. 4 and FIG. 5: some exemplary embodiments of the invention relate to an alignment control mechanism including a rotating rotor hub 6 marked with one or more markers 5 a fixed position sensor 4 configured to provide output signal indicating presence (1) (FIG. 5) or absence (0) (FIG. 4) of marker 5. Presence/Absence here refers to the detection area of the sensor. According to these embodiments an electronic controller (as described above) is configured to respond to output signal (0) by pulsing a motor powering rotor hub 6. This same motor powers rotors 1. The motor pulses are repeated until output signal (1) is achieved. In some embodiments, at this point arms 2 are engaged by posts 3 and rotors 1 are locked.

Exemplary Method

In some exemplary embodiments of the invention there is provided a method including independently calculating a desired stowing angle with respect to travel direction for each rotor in a multi-rotor aircraft and stopping and locking each rotor at said desired stowing angle. Operation of lock mechanism and/or alignment control mechanisms as described above constitutes practice of the method.

Exemplary Magnet Considerations

In some embodiments magnets of 7.5N are employed in arms 2 and/or posts 3. In some embodiments if the magnets are sufficiently strong to engage one another, they are strong enough to prevent rotation of rotors 1. However, without the described locking mechanism, the angle θ at which rotors 1 stop relative to line L-L would be random and the amount of drag would vary as a function of angle θ.

It is expected that during the life of this patent many new technologies suitable to engage ends of arms 2 will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of hybrid aircraft but might also be used to lock rotors while deploying an emergency parachute.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A rotor lock mechanism comprising:
   (a) a pair of arms at a chosen offset angle θ with respect to a long axis of a pair of rotor blades;
   (b) an arm engagement device configured to restrain rotary motion of said arms;
   (c) a rotor drive shaft to which said pair of arms and said pair of rotor blades are attached;
   (d) a rotating rotor hub marked with one or more markers;
   (e) a fixed position sensor configured to provide output signal indicating presence (1) or absence (0) of said marker; and
   (f) an electronic controller configured to respond to output signal (0) by pulsing a motor powering the rotor hub to bring the arms into alignment with the arm engagement device.

2. The rotor lock mechanism according to claim 1, comprising:
   pivot axles in each of said arms.

3. The rotor lock mechanism according to claim 2, wherein the arm engagement device comprises:
   a pair of engagement posts positioned to engage and retain a distal portion of each of said lock arms when they are rotated downwards with respect to said pivot axles.

4. The rotor lock mechanism according to claim 3, comprising:
   a magnet in a distal portion of each of said lock arms; and
   a corresponding magnet of opposite polarity in a top surface of each of said engagement posts.

5. The rotor lock mechanism according to claim 3, comprising:
   a magnet in a distal portion of each of said lock arms; and
   a corresponding electromagnet in a top surface of each of said engagement posts.

6. The rotor lock mechanism according to claim 1, comprising:
   a collar on said rotor drive shaft which said pair of arms is attached to; and
   a motor that turns said collar with respect to said rotor drive shaft.

7. An alignment control mechanism comprising:
   a rotating rotor hub marked with one or more markers;
   a fixed position sensor configured to provide output signal indicating presence (1) or absence (0) of said marker; and
   an electronic controller configured to respond to output signal (0) by pulsing a motor powering said rotor hub to bring the arms into alignment with an arm engagement device, the arm engagement device is configured to restrain rotary motion of said arms.

8. A method of using the rotor lock mechanism of claim 1 comprising:
   (a) independently determining a desired stowing angle with respect to travel direction for each rotor in a multi-rotor aircraft; and
   (b) stopping and locking each rotor at said desired stowing angle.

* * * * *